United States Patent [19]

Geary et al.

[11] 4,238,827

[45] Dec. 9, 1980

[54] INTERFEROGRAM SYNTHESIZATION METHOD AND APPARATUS

[75] Inventors: Joseph M. Geary, Edgewood; David F. Holmes, Albuquerque, both of N. Mex.

[73] Assignee: The United States of America as represented by the Secretary of the Air Force, Washington, D.C.

[21] Appl. No.: 962,411

[22] Filed: Nov. 20, 1978

[51] Int. Cl.³ .............................................. G01B 11/00
[52] U.S. Cl. ..................................... 364/521; 340/720; 356/359; 356/363; 358/107; 364/525; 364/578
[58] Field of Search ............... 364/521, 525, 578, 806; 356/345–363; 340/720, 732, 744, 725, 747; 328/188; 358/88, 107

[56] References Cited

U.S. PATENT DOCUMENTS

| | | | |
|---|---|---|---|
| 1,565,533 | 12/1925 | Twyman et al. | 356/360 |
| 3,537,096 | 10/1970 | Hatfield | 340/725 |
| 3,544,833 | 12/1970 | Miura et al. | 340/725 |
| 3,649,754 | 3/1972 | Macovski | 358/107 |
| 3,879,988 | 4/1975 | Jacobs | 356/359 |
| 3,932,949 | 1/1976 | King | 35/19 B |
| 3,988,728 | 10/1976 | Inoue et al. | 364/521 |
| 4,075,620 | 2/1978 | Passavant et al. | 364/521 |

*Primary Examiner*—Errol A. Krass
*Attorney, Agent, or Firm*—Joseph E. Rusz; Willard R. Matthews

[57] ABSTRACT

Real time presentation and evaluation of any selected interferogram is realized by electronically simulating optical aberration patterns and displaying them on a cathode ray tube (CRT). The optical aberration patterns include PISTON; X and Y TILT; DEFOCUS; SPHERICAL; COMA; and ASTIGMATISM. The aberration patterns are generated electronically in response to the CRT beam sweep drive signal and are displayed as a function of CRT beam intensity. Any combination of aberration patterns, each having selectable coefficients, can be displayed. The aberration pattern coefficient values are indicated by a digital readout. Evaluation of an unknown interferogram is accomplished by varying aberration pattern combinations and coefficients until a substantial match with the unknown interferogram is achieved. The contributing aberration patterns are then known and their magnitudes are determined from the digital read-out.

14 Claims, 4 Drawing Figures

INTERFEROGRAM SYNTHESIZATION METHOD AND APPARATUS

STATEMENT OF GOVERNMENT INTEREST

The invention described herein may be manufactured and used by or for the Government for governmental purposes without the payment of any royalty thereon.

BACKGROUND OF THE INVENTION

This invention relates to methods and means for displaying and evaluating interferograms. In particular, it comprehends an electronic analog inteferogram synthesizer for providing a real time display of any desired optical aberration pattern or any combination of aberration patterns having any given coefficients.

Interferograms are representations of optical interference patterns and are commonly used in evaluating optical systems. The interference pattern of the interferogram results from optical aberrations such as PISTON; X and Y TILT; DEFOCUS; SPHERICAL; COMA; and ASTIGMATISM. In prior art practice these aberrations are generated optically by means in which the optical system wavelength is compared to a reference optical wavelength. The optical system evaluation procedure includes determining which aberration or combination of aberrations are present. It is also necessary to determine the coefficients or magnitudes of each contributing aberration. The reduction and interpretation of interferograms has in the past been a laborious and difficult procedure. Commonly, the optically obtained interferogram information is derived and a computer is programmed to put a surface to the desired data from which aberration information is extracted.

In addition to their use in optical system evaluations interferograms are the subject of study in Universities and other institutions teaching optics and related studies. In such an environment the ability to generate and display in real time any given aberration or combination of aberrations and aberration coefficients would be an invaluable teaching aid and would provide students with experience that would otherwise require years of laboratory work. Currently in order to demonstrate interferograms it is necessary to either show a slide or set up an optical system with a light source from which only a limited number of aberration patterns can be realized.

In view of the foregoing it is apparent that there currently exists the need for improved and simplified methods and means for evaluating optical systems and for extracting aberration information from the interferograms developed in current optical system evaluation practices. There also exists the need in colleges and universities for an interferogram synthesizer that is capable of displaying in real time any selected aberration pattern or combination of aberration patterns.

The present invention is directed toward satisfying these needs.

SUMMARY OF THE INVENTION

The interferogram synthesizer of the invention comprises a CRT, a CRT beam scan driver circuit, an aberration generator and a CRT beam intensity control circuit. The CRT beam scan driver circuit drives the CRT beam through a spiral trace. The aberration generator electrically generates signals that represent simulations of the optical aberration patterns of PISTON; X and Y TILT; DEFOCUS, SPHERICAL, COMA and ASTIGMATISM. These signals are generated simultaneously as a function of the CRT beam position. The aberration generator provides for the selection of any aberration pattern or any combination of aberration patterns and also permits manipulation of their coefficients. Aberration signal coefficients are displayed on a digital read out. The signals generated by the aberration signal generator are summed and fed to the CRT beam intensity control circuit. The CRT beam intensity control circuit includes parallel window comparators which receive the summed signal output. The outputs of the window comparators feed an OR gate. The OR gate in turn controls a modulator driver. The modulator driver intensity modulates the CRT beam providing an interferogram on the CRT screen that is an electronic simulation of the aberration pattern combination generated by the aberration generator. Any desired interferogram can thus be displayed in real time. The contributing optical aberrations and coefficients of an unknown interferogram can readily be determined by varying aberration generator inputs until a reasonable match with the unknown interferogram is achieved. Aberration coefficients are then read directly from the digital read-out.

It is a principal object of the invention to provide new and improved method and means for synthesizing interferograms.

It is another object of the invention to provide new means for electronically simulating interferograms.

It is another object of the invention to provide means for displaying in real time electronically synthesized interferograms.

It is another object of the invention to provide a new and improved method of evaluating unknown interferograms.

It is another object of the invention to provide an interferogram synthesizer and method of utilization that permits the rapid approximation of the kind and magnitude of aberration coefficients present in an unknown interferogram.

It is another object of the invention to provide a new and improved interferogram synthesizer that can be adapted as a class room educational tool whereby students can acquire a familiarity with interference patterns in a few hours that would normally require months of in-lab experience.

These together with other objects, features and advantages of the invention will become more readily apparent from the following detailed description when taken in conjunction with the illustrative embodiments in the accompanying drawings.

DESCRIPTION OF THE DRAWINGS

FIG. 5 is a schematic of the raster generator portion of FIG. 4a;

FIG. 6 is a schematic of the X TILT, Y TILT, DEFOCUS and SPHERICAL portions of the aberration generator of FIG. 4a;

FIG. 7 is a schematic of the X ASTIGMATISM, Y ASTIGMATISM, X COMA and Y COMA portions of the aberration generator of FIG. 4a;

DETAILED DESCRIPTION OF THE PREFERRED EMBODIMENT

The invention hereinafter described comprehends the method and means for electrically synthesizing real time simulated interferograms. It also comprehends displaying the synthesized interferograms on a cathode ray tube (CRT) scope whereby the contributing simulated optical aberrations can be continuously varied as to aberration pattern combinations and magnitudes. By extension, the method of the invention utilizes this capability to synthesize interferograms that match unknown interferograms thus permitting interferogram evaluation by simple comparison techniques.

The electronic analog device of the invention, termed an Interferogram Synthesizer (IS) displays synthesized interferograms on an oscilloscope cathode ray tube (CRT) in real-time for viewing. The following aberrations are generated: PISTON; X & Y TILT; DEFOCUS; SPHERICAL; COMA; ASTIGMATISM. These aberrations with the exception of PISTON are conventional optical aberrations. They are defined in the test *Aberrations of The Symmetrical Optical System*, W. T. Welford, Academic Press, 1974. PISTON, strictly speaking is not an aberration but a D.C. offset that affects the entire wavefront the same amount. All can be presented individually or in any combination. The magnitude of each is calibrated and adjustable over 8 wavelengths. Also incorporated in the IS are the capabilities of presenting a line profile along any radial direction, and a three dimensional display ability. As noted above, the IS can aid in the fast reduction of unknown interferograms i.e., the operator would attempt to match the IS display to an unknown interferogram. Once a reasonable correlation between the two is arrived at, the operator can simply read off the magnitudes of the various aberrations from the synthesizer's read-out. The IS also provides an exceptional educational tool. For those involved with interferometry the instructional value of being able to quickly see the fringe patterns generated for any combination (and relative amounts) of the various aberrations is enormous.

Figures 1, 2, 3:
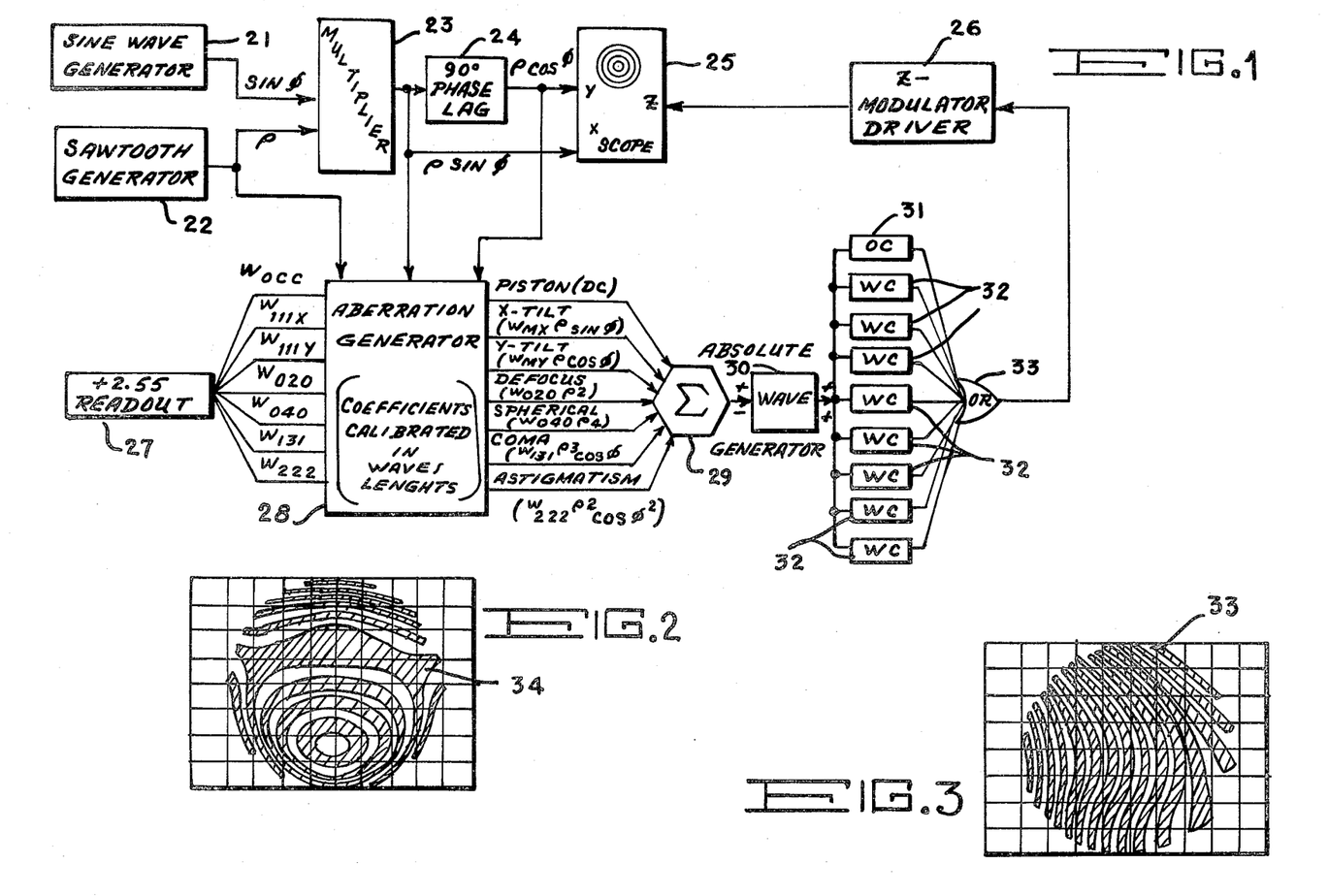
FIG. 1 is a general block diagram of the invention illustrating principal functional components.
FIG. 2 illustrates a typical interferogram generated by the apparatus of the invention.
FIG. 3 illustrates another typical interferogram.

FIG. 1 is a general functional block diagram of apparatus that will implement the foregoing. Referring thereto the device comprises a cathode ray tube device (CRT) such as oscilloscope 25, a beam scan driver circuit consisting of sine wave generator 21, sawtooth generator 22 multiplier 23 and 90° phase shifter 24, an aberration generator 28 having a digital readout 27, summing means 29, and a beam intensity drive consisting of absolute wave generator 30, the array of window comparators 32, OR gate 33 and modulation driver 26. Since the aberrations are conveniently described in terms of polar coordinates, the CRT traces out a tight spiral scan (instead of a rectilinear raster e.g. TV). The display intensity is then modulated as a function of radius (p) and angle ($\phi$). The resulting pattern represents the phase distribution across a circular exit pupil. The spiral scan is generated via the services of sine-wave and sawtooth generators 21 and 22. Phase shift network 24 shifts the phase between the x & y inputs to the scope by 90°. The functions p, p cos $\phi$, and p sine $\phi$ are inputed to aberration generator (AG) 28. Individual circuits then shape the various aberration functions. The functional form of these are shown at the output channels of the AG. The magnitude of each aberration is chosen at will and its value (calibrated in wavelengths, X) is displayed on a digital readout 27. Contributions from each aberration are then combined in a summing circuit 29 and put through an absolute value amplifier (AVA) 30 which puts out a voltage between 0 to +10 volts. The output of the AVA is coupled into an array of window comparator (WC) 32. Only one WC is activated at any one time. The output from each WC is fed into "OR" gate 33 whose output is either 0 to 5 volts, i.e., if a voltage from the AVA lies within the range of any WC the OR-gate puts out a blanking signal. The output signal of the OR-gate is then made compatible with the z-input of the oscilloscope 25 via the z-modulator drive 25 whose output range is ±15 volts.

What this means as far as optical simulation is: the AG is effectively generating a 3-D surface above and/or below a plane defined as the "exit-pupil". This is a phase-surface. The WC's are a vertical stack of equally spaced planes above and parellel to the exit-pupil plane. These planes cut the phase-surface at a number of points. The point of view presented by the oscilloscope display is: looking along the optical-axis (which is centered and normal to the exit-pupil) one sees the contours of the intersection points between the phase-surface and array of parallel planes.

FIGS. 2 and 3 illustrate typical interferograms that can be synthesized by the apparatus of the invention. Interferogram 34 of FIG. 2 represents the optical aberration pattern combination of X-TILT=0 ($W_{020}=1.3\lambda$);
Y-TILT=$-5.2\lambda$ ($W_{040}=-0.8\lambda$); PISTON=0($W_{222}=4.2$).
Interferogram 33 of FIG. 3 represents the optical aberration pattern combination of X$-$TILT=0 ($W_{020}=1.0\lambda$);
Y$-$TILT=$1.1\lambda$ ($W_{040}=-2.0\lambda$); PISTON=0 ($W_{222}=4.7\lambda$).

Figure 4A:
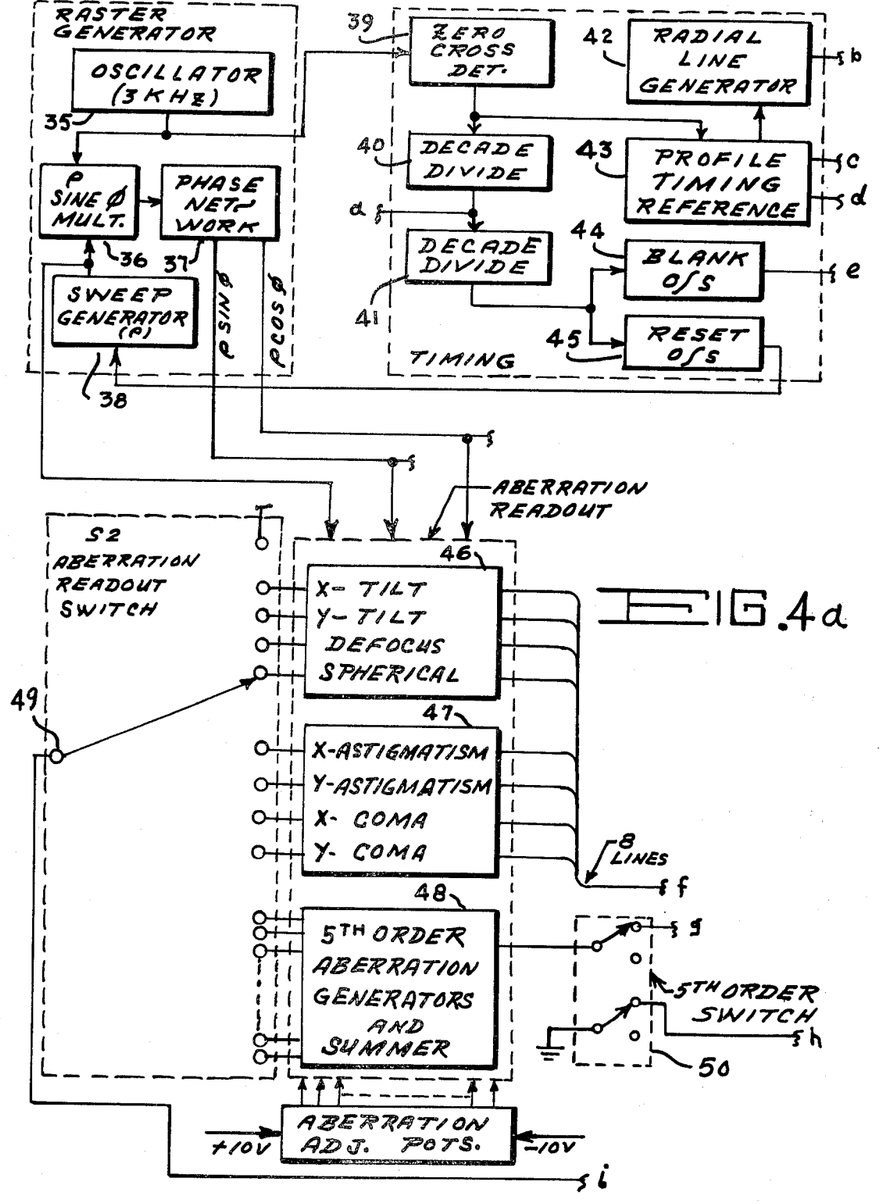
FIGS. 4a, 4b and 4c in combination constitute a detailed block diagram of one presently preferred embodiment of the invention.
Figure 4B:
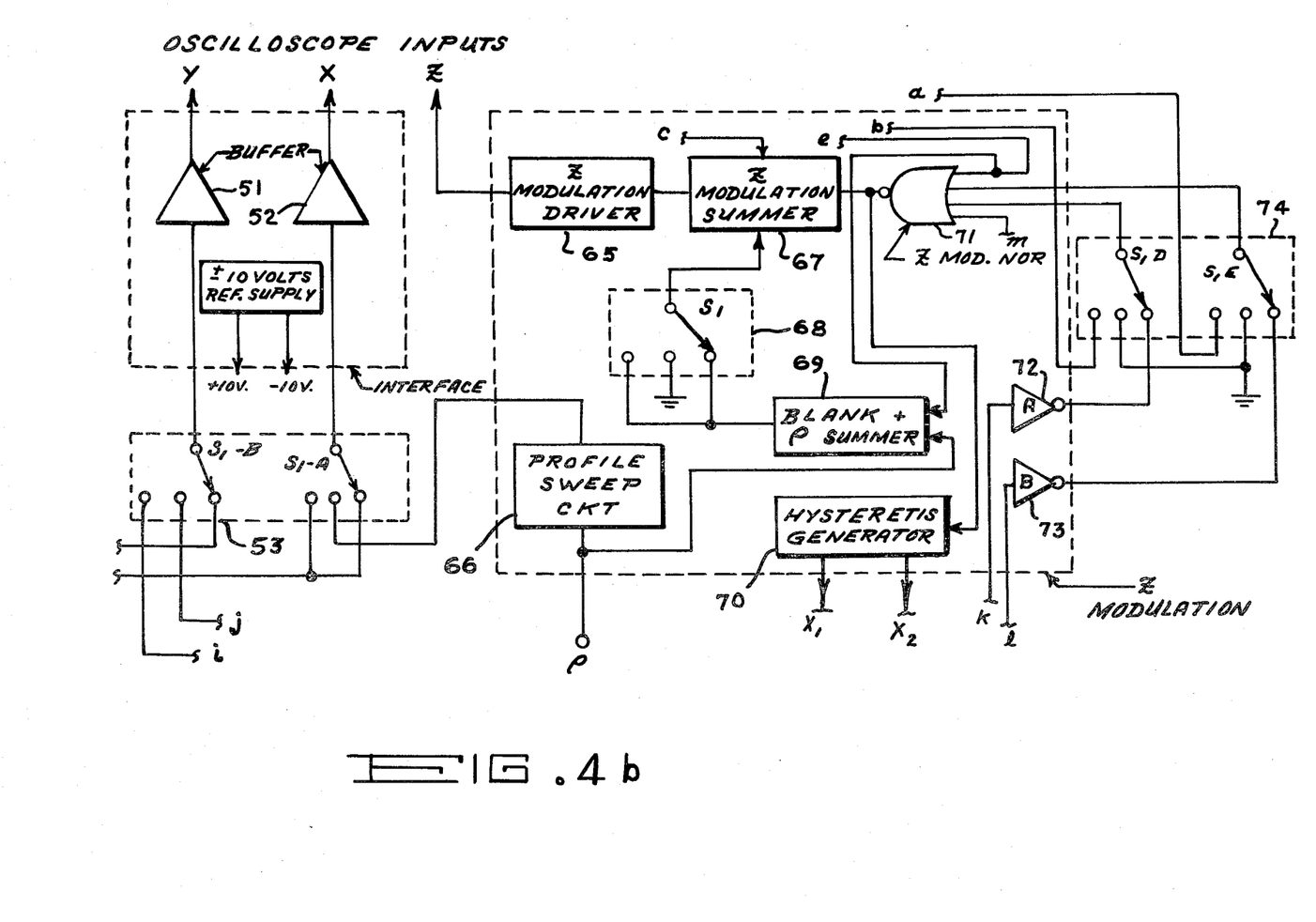
Figure 4C:
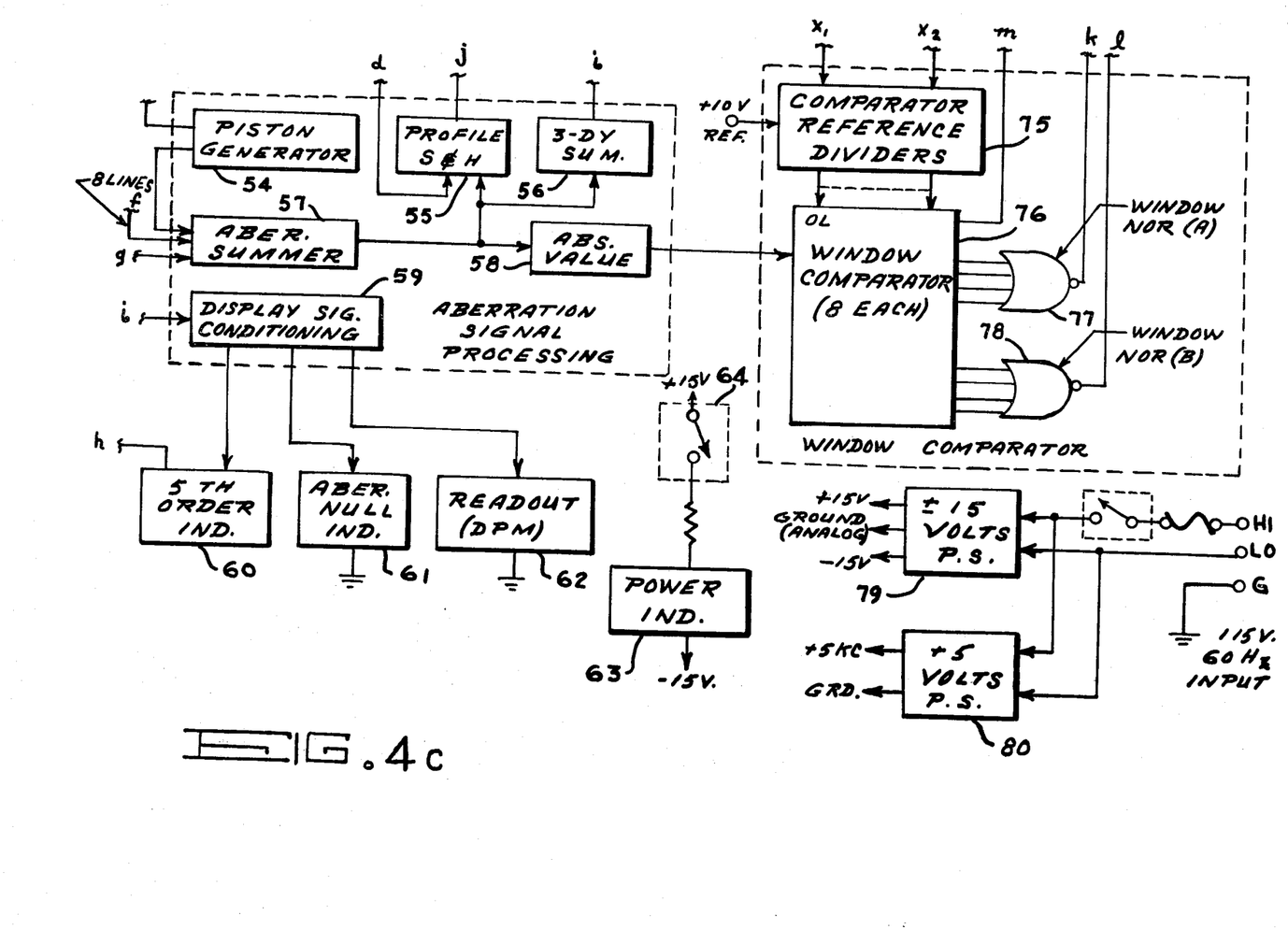

FIGS. 4a, 4b and 4c in combination comprise a detailed block diagram of one presently preferred embodiment of the invention. Referring to FIG. 4a the beam scan circuit is shown as a raster generator and associated timing circuit. The raster generator comprises oscillator 35, p sin $\phi$ multiplier 36, sweep generator 38 and phase shift network 37. The timing circuit includes zero crossing detector 39, decade dividers 40, 41, radial line generator 42, profile timing reference 43 blanking circuit 44 and reset 45. FIG. 4a also includes aberration generator components 46, 47, 48, aberration read out switch 49 and fifth order aberration switch 50. FIG. 4b shows the CRT modulation drive circuit comprising z-modulation driver 65, z modulation summer 67, z modulation NOR gate 71, profile sweep circuit 66, blanking circuit 69, hysteresis generator 70, amplifier 72, 73 and switch 68, 7 completing the block diagram includes the aberration signal processing circuit components piston generator 54 profile S and H circuit 55, summer 56, aberration summer 57, absolute valve amplifier 58, and display signal conditioning circuit 59. Also shown are fifth order aberration indicator 60, aberration null indicator 61, digital readout 62, power indicator 63 and the window comparator circuit which includes window comparators 76, comparator reference divider 75 and NOR gates 77, 78. Power to the system is supplied through power supplies 79, 80.

Figure 5:
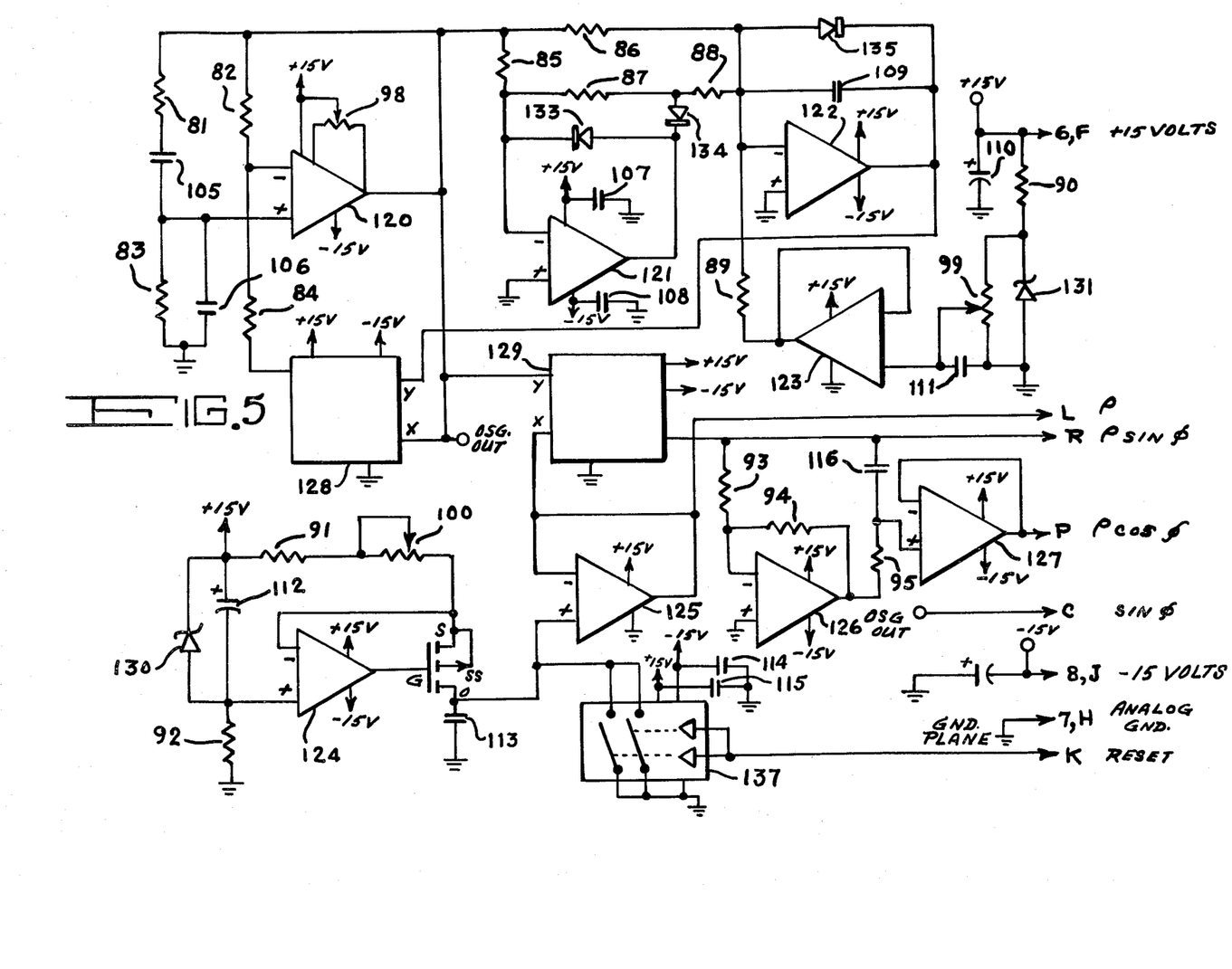

Schematic diagrams for the circuits shown in FIGS. 4a, 4b and 4c are illustrated by FIGS. 5 through 11. The schematic of FIG. 5 represents the raster generator. This circuit includes a sine wave generator comprising multiplier 128, amplifiers 120-123, diodes 133-135, zener diode 131, potentiometers 98, 99, capacitors 105-111, and resistors 81-90, a sawtooth generator comprising amplifier 124, analog switch 137, potentiometer 100, zener diode 130, resistors 91, 92, and capacitors 112-115, buffer amplifier 125, multiplier 129, and a phase shift circuit comprising amplifiers 126, 127, resistors 93-95, and capacitor 116.

Figure 6:
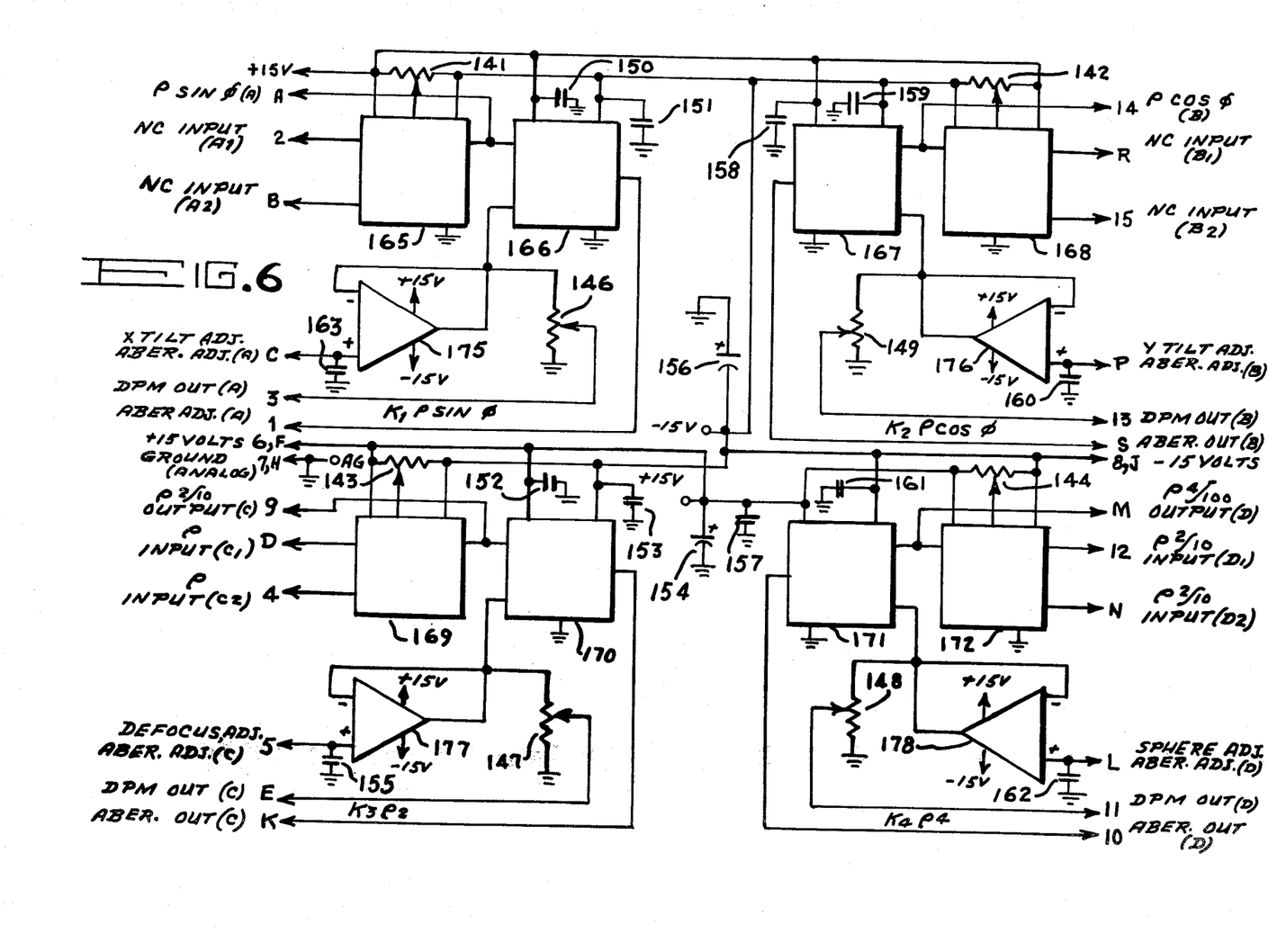

Schematic diagrams of the X-TILT, Y-TILT, DEFOCUS and SPHERICAL circuits of aberration generator are illustrated by FIG. 6. The X-TILT circuit comprises multipliers 165, 166, amplifier 175, resistors 141, potentiometer 146, and capacitors 150, 151, 163. The Y-TILT circuit comprises multipliers 167, 168, amplifier 176, resistor 142, potentiometer 149 and capacitors 158-160. The DEFOCUS circuit comprises multipliers 169, 170, amplifier 177, resistor 143, potentiometer 147 and capacitors 152-155. The SPHERICAL circuit comprises multipliers 171, 172, amplifier 178, resistor 144, potentiometer 148, and capacitors 156, 157, 161, 162.

Figure 7:
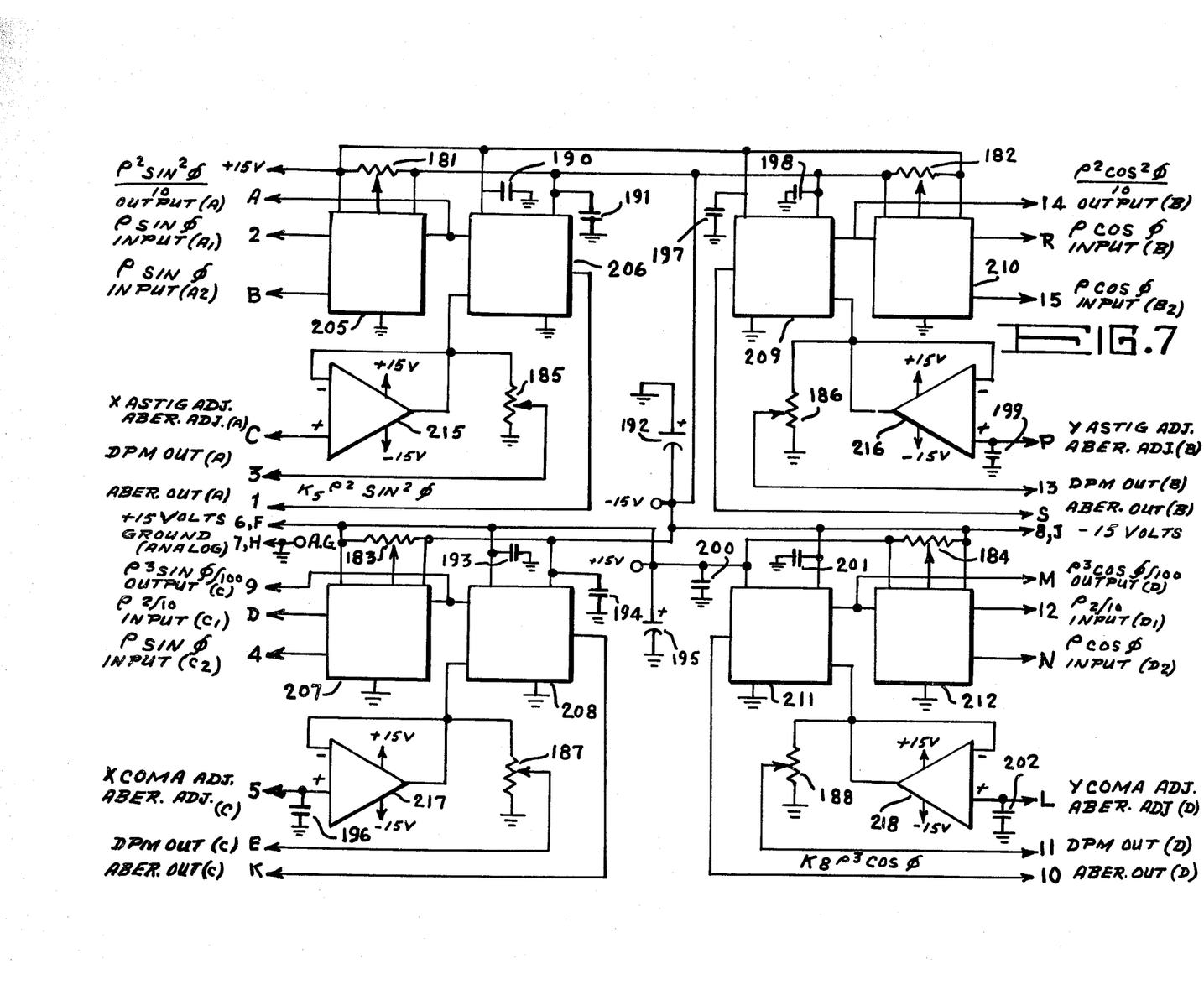

FIG. 7 is a schematic of the X-ASTIGMATISM, Y-ASTIGMATISM, X-COMA and Y-COMA circuits. The X-ASTIGMATISM circuit includes multipliers 205, 206, amplifier 215, resistor 181, potentiometer 185, and capacitors 190, 191. The Y-ASTIGMATISM circuit includes multipliers 209, 210, amplifier 216, potentiometer 186, resistor 182, and capacitors 197-199. The X-COMA circuit comprises multipliers 207, 208, resistor 183, amplifier 217, potentiometer 187, and capacitors 193-195. The Y-COMA circuit comprises multipliers 211, 212, resistor 184, potentiometer 188, amplifier 218 and capacitors 200-202.

Figure 8:
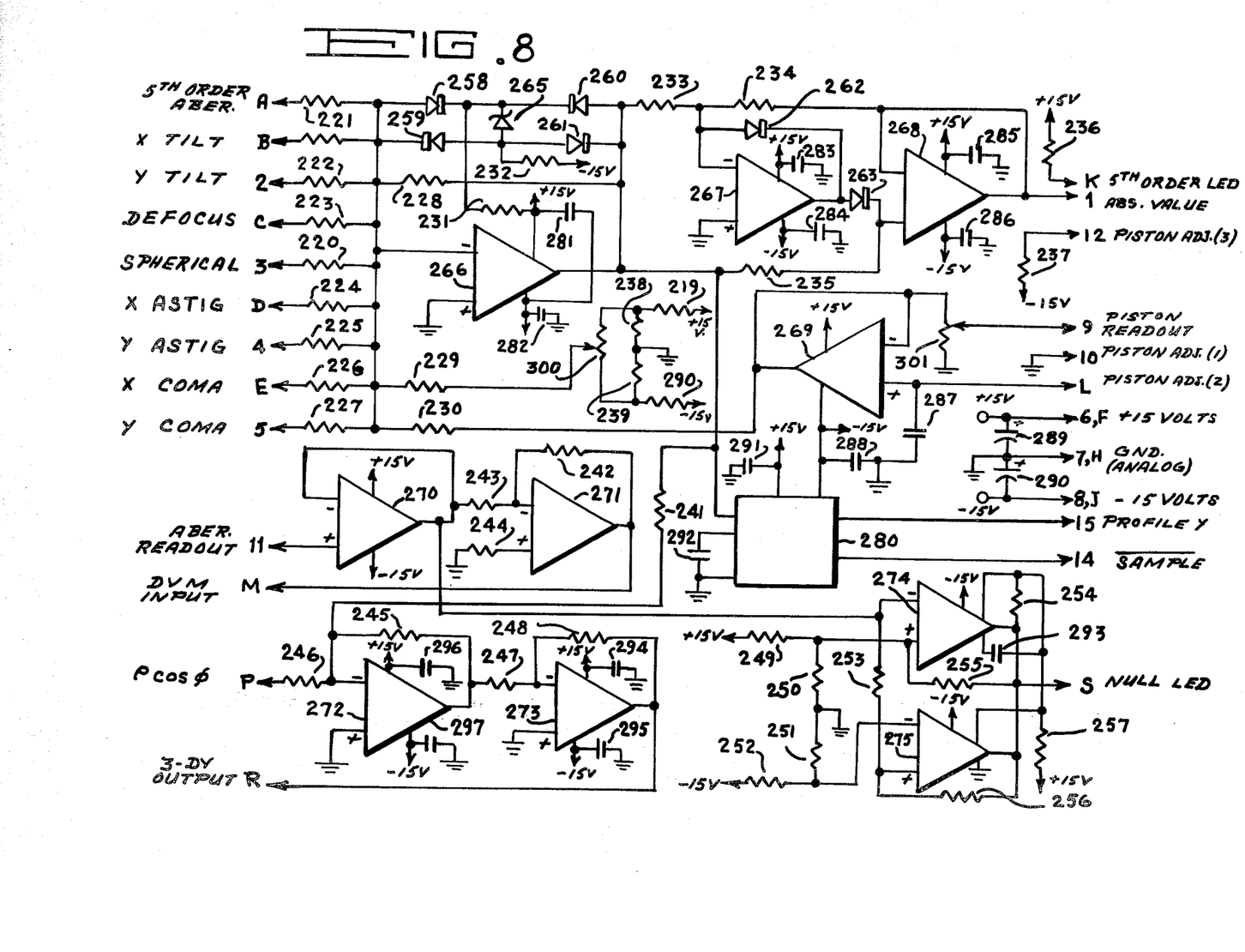
FIG. 8 is a schematic of the aberration signal processing circuits of FIGS. 4a and 4b.

FIG. 8 is the aberration signal processing schematic and comprises a summer that includes amplifier 266, diodes 258-261, resistors 219-232, 238, 239, 290, capacitor 282, and potentiometer 300, an absolute value amplifier comprising amplifier 267, 268, diodes 262, 263, resistors 233-237, and capacitors 283-286, PISTON aberration circuit of amplifier 269 and potentiometer 301, amplifiers 270-275, resistors 241-257, and capacitors 287-297.

Figure 9:
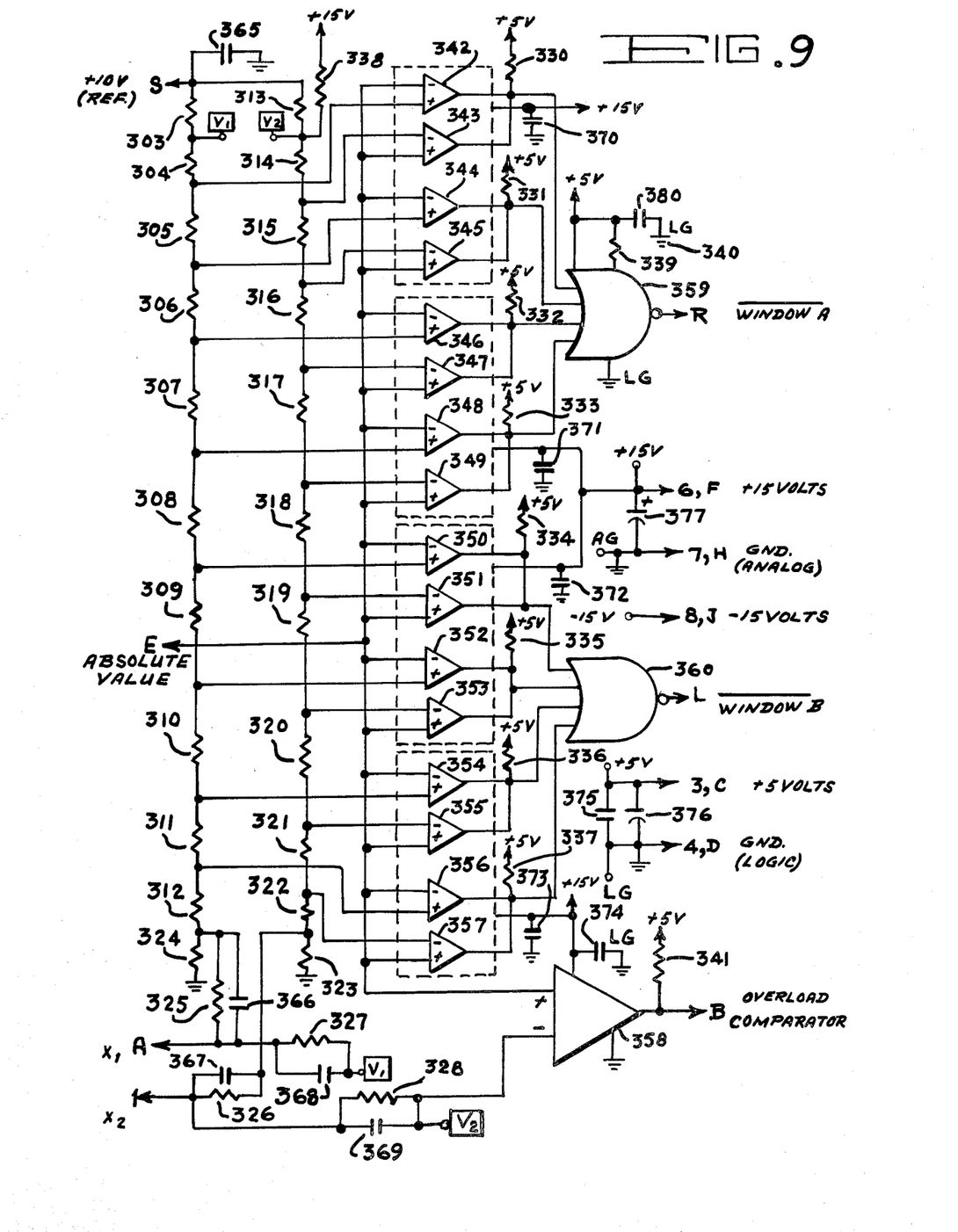
FIG. 9 is a schematic of the window comparator circuit of FIG. 4c.

The window comparator circuit is illustrated in schematic form by FIG. 9. It comprises OR gates 359, 360, amplifiers 342-358, resistors 303-339, and capacitors 366-380.

Figure 10:
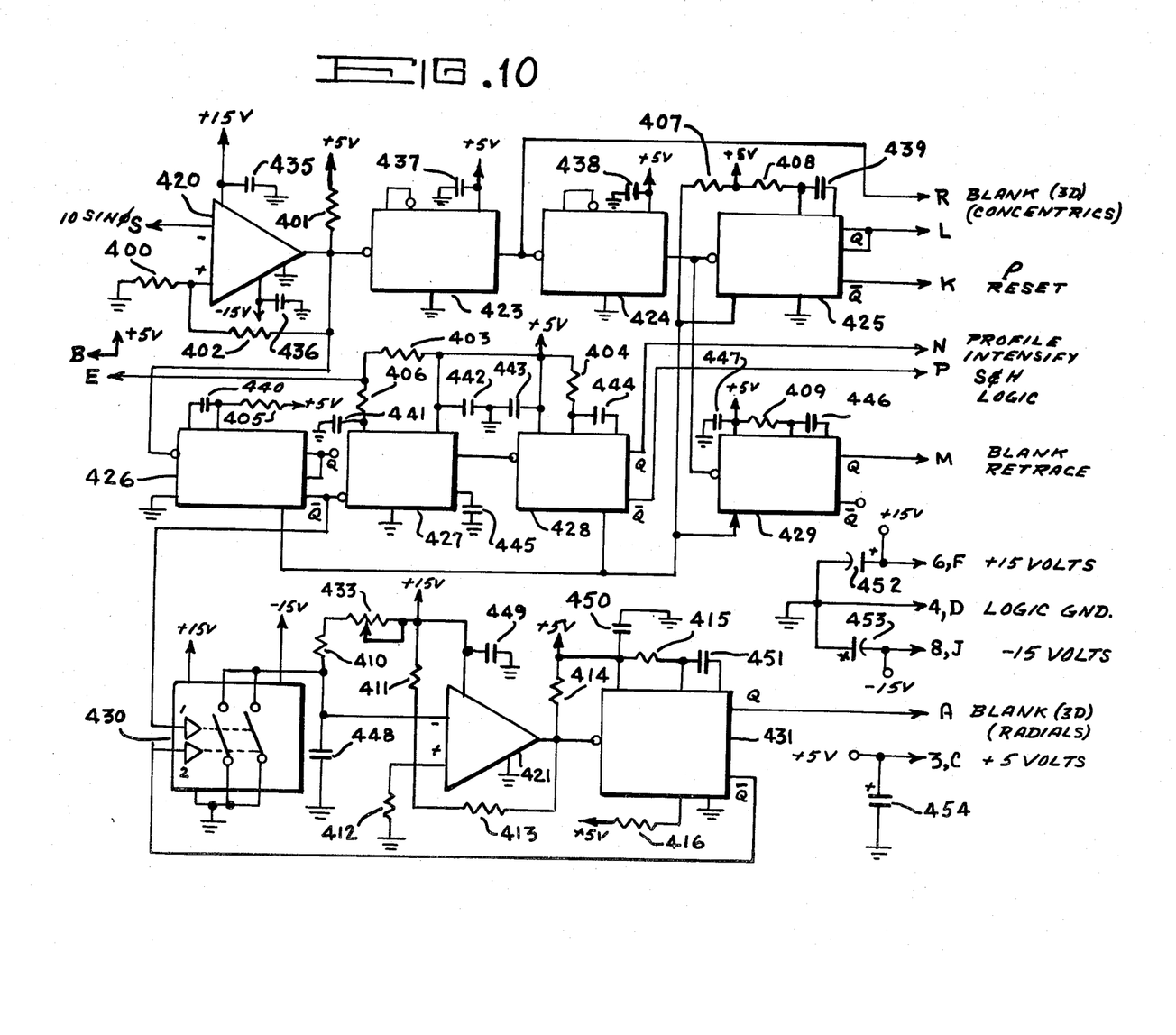
FIG. 10 is a schematic of the timing circuits of FIGS. 4a, 4b and 4c.

The timing schematic is illustrated by FIG. 10 and comprises the zero crossing detector that includes amplifier 420, resistors 400-402, and capacitors 435, 436, decade dividers 423, 424, reset one shot multivibrator 425, with resistors 407, 408 and capacitor 439, a blanking circuit comprising multivibrator 429, resistor 409, and capacitors 447, 448, and the timing circuit comprising multivibrator 426, 428, multiplier 431, switch 430, amplifier 421, capacitors 440-454, resistors 404-406, 410-416 and potentiometer 433.

Figure 11:
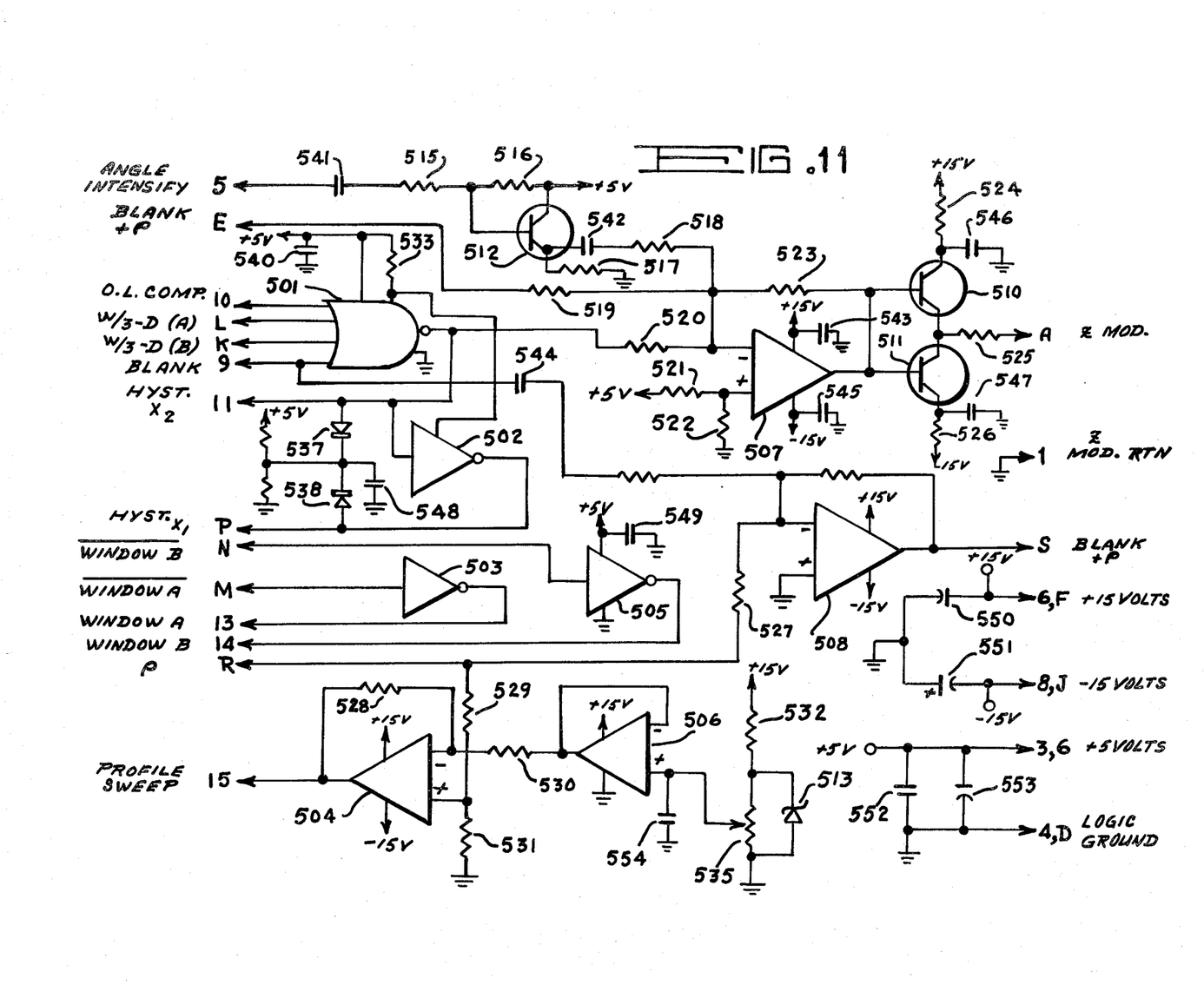
FIG. 11 is a schematic of the Z modulation circuit of FIG. 4b.

The Z modulation circuit of FIG. 11 consists of NOR gate 501, amplifiers 502-508, transistors 510, 511, 512, zener diode 513, diodes 537, 538, potentiometer 535, resistors 515-533, and capacitors 540-554.

Figure 12:
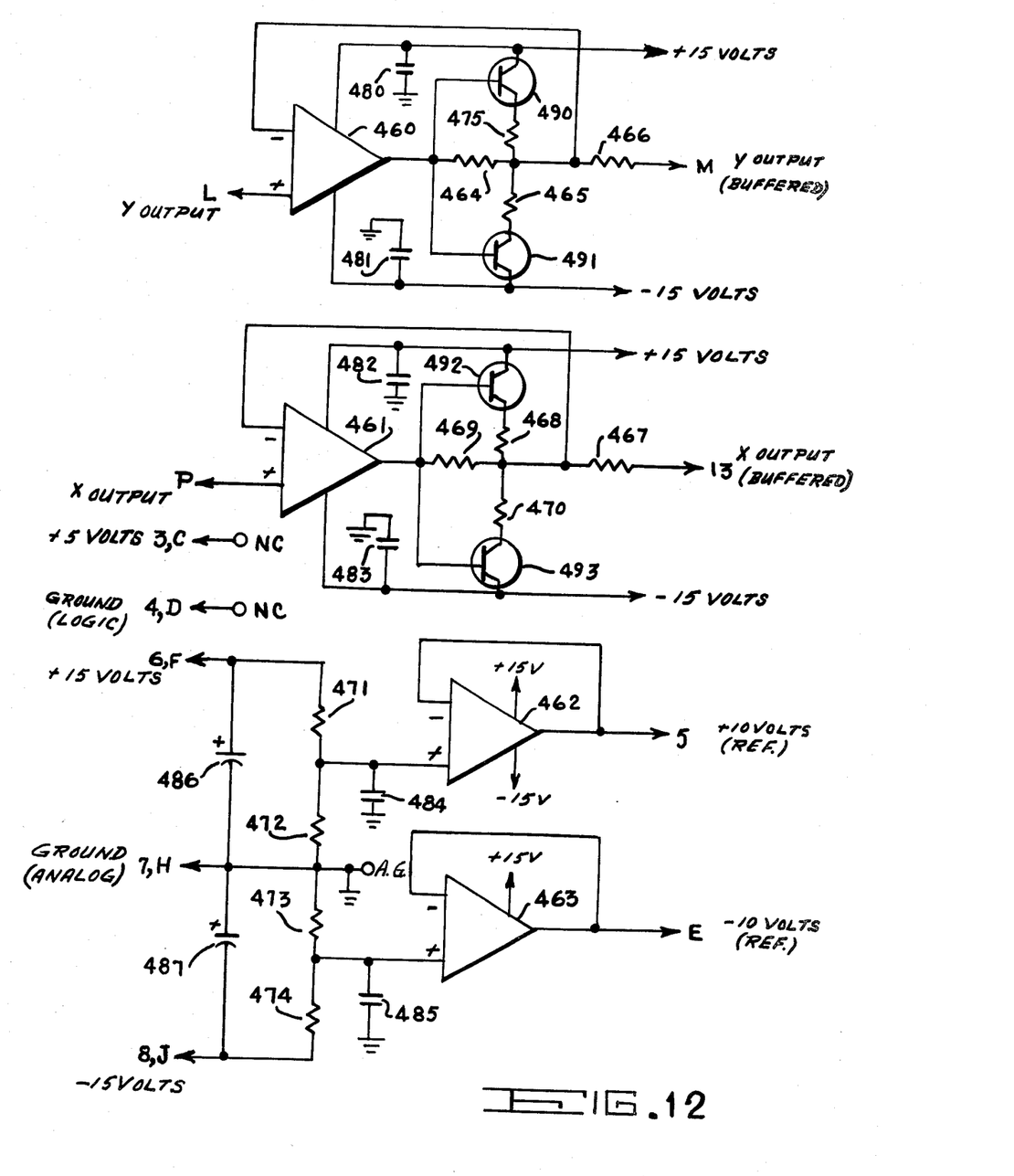
FIG. 12 is a schematic of the interface circuits of FIGS. 4a, 4b and 4c.

FIG. 12 is a schematic diagram of the interface circuitry and comprises amplifiers 460-463, transistors 490-493, resistors 464-475 and capacitors 480-487.

While the invention has been described in its preferred embodiment it is understood that the words which have been used are words of description rather than words of limitation and that changes with the purview of the appended claims may be made without departing from the scope and spirit of the invention in its broader aspects.

What is claimed is:

1. An interferogram synthesizer comprising cathode ray tube means,
    a beam scan circuit generating a drive signal for driving the cathode ray tube beam,
    an electronic aberration generator for generating an aberration pattern signal as a function of said beam scan circuit drive signal,
    means for selectively varying coefficients of said aberration pattern signal, and
    a cathode ray tube beam intensity drive circuit connected to control the intensity of said cathode ray tube beam in response to aberration pattern signals from said aberration generator.

2. An interferogram synthesizer as defined in claim 1 wherein said electronic aberration generator generates a PISTON aberration pattern signal.

3. An interferogram synthesizer as defined in claim 1 wherein said electronic aberration generator generates an X TILT aberration pattern signal.

4. An interferogram synthesizer as defined in claim 1 wherein the aberration generator generates a Y TILT aberration pattern signal.

5. An interferogram synthesizer as defined in claim 1 wherein said electronic aberration generator generates a DEFOCUS aberration pattern signal.

6. An interferogram synthesizer as defined in claim 1 where said electronic aberration generator generates a SPHERICAL aberration pattern signal.

7. An interferogram synthesizer as defined in claim 1 wherein said electronic aberration generator generates a COMA aberration pattern signal.

8. An interferogram synthesizer as defined in claim 1 wherein said electronic abberration generator generates an ASTIGMATISM aberration pattern signal.

9. An interferogram synthesizer as defined in claim 1 wherein said electronic aberration generator simultaneously generates the aberration pattern signals for PISTON, X TILT, Y TILT, DEFOCUS, SPHERICAL, COMA, and ASTIGMATISM and includes means for individually varying the coefficients of each said aberration pattern signal and means for selecting combinations of patterns, and wherein
    said beam intensity drive circuit includes
    a summer means for combining discrete aberration pattern signals received from said aberration generator,
    a parallel bank of window comparators each receiving the output of said summer means,
    an OR gate, and
    a modulator driver, said OR gate receiving the outputs of said window comparators and feeding said modulator driver, said modulator driver controlling the intensity of said cathode ray tube beam.

10. An interferogram synthesizer as defined in claim 9 wherein said aberration generator includes a digital read out display of aberration pattern signal coefficients.

11. An interferogram synthesizer as defined in claim 10 wherein said beam scan circuit drives said cathode ray tube beam in a spiral scan.

12. An interferogram synthesizer comprising
a cathode ray tube generating a beam,
a beam scan circuit generating a drive signal for driving the cathode ray tube beam,
an aberration generator for simultaneously generating a multiplicity of simulated optical aberration pattern signals as a function of said beam scan circuit drive signal,
summer means for summing aberration pattern signals from said aberration generator, and
means for controlling the intensity of the cathode ray tube beam as a function of the combined aberration pattern signals.

13. The method of displaying and evaluating interferograms comprising the steps of
simultaneously electronically generating at least two optical aberration patterns as a function of the beam position of a cathode ray tube, said aberration patterns being selected from the group of optical aberrations consisting of PISTON; X TILT; Y TILT; DEFOCUS; SPHERICAL; COMA; and ASTIGMATISM,
selectively varying aberration patterns,
combining said aberration patterns, and
displaying the combined aberration pattern on said cathode ray tube as a function of cathode ray tube beam intensity.

14. The method of displaying and evaluating interferograms defined in claim 13 including the steps of
varying aberration pattern combinations and aberration patterns to obtain a resultant interferogram that substantially matches a given unknown interferogram, and recording the aberration pattern combinations and patterns for said matching condition.

* * * * *